United States Patent
Hui et al.

(10) Patent No.: US 9,077,638 B2
(45) Date of Patent: *Jul. 7, 2015

(54) SYSTEM AND METHOD FOR PROVIDING ROUTE INFORMATION

(71) Applicant: Cisco Technology, Inc., San Jose, CA (US)

(72) Inventors: Jonathan W. Hui, Foster City, CA (US); Alec Woo, Union City, CA (US); David E. Culler, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/100,145

(22) Filed: Dec. 9, 2013

(65) Prior Publication Data

US 2014/0092749 A1    Apr. 3, 2014

Related U.S. Application Data

(63) Continuation of application No. 12/290,850, filed on Nov. 3, 2008, now Pat. No. 8,670,325.

(60) Provisional application No. 61/001,634, filed on Nov. 1, 2007.

(51) Int. Cl.
| | | |
|---|---|---|
| *H04J 3/14* | (2006.01) | |
| *H04L 12/727* | (2013.01) | |
| *H04L 12/801* | (2013.01) | |
| *H04L 12/759* | (2013.01) | |
| *H04W 40/00* | (2009.01) | |
| *H04W 40/24* | (2009.01) | |

(52) U.S. Cl.
CPC .............. *H04L 45/121* (2013.01); *H04L 47/12* (2013.01); *H04L 45/028* (2013.01); *H04W 40/00* (2013.01); *H04W 40/24* (2013.01)

(58) Field of Classification Search
CPC ........... H04J 3/14; H04L 45/121; H04L 47/12
USPC .................................................. 370/238, 351
See application file for complete search history.

(56) References Cited

U.S. PATENT DOCUMENTS

| | | |
|---|---|---|
| 6,260,072 B1 | 7/2001 | Rodriguez-Moral |
| 6,584,500 B1 | 6/2003 | Arkko |
| 6,606,303 B1 | 8/2003 | Hassel et al. |
| 6,904,275 B2 | 6/2005 | Stanforth |
| 7,002,917 B1 | 2/2006 | Saleh |
| 7,058,016 B1 | 6/2006 | Harper |
| 7,423,995 B1 | 9/2008 | Elliott et al. |
| 7,961,740 B2 | 6/2011 | Flammer et al. |
| 8,085,768 B1 | 12/2011 | Hui et al. |

(Continued)

OTHER PUBLICATIONS

Non-final Office Action issued Feb. 16, 2011 in U.S. Appl. No. 12/290,848, 12 pages.

(Continued)

*Primary Examiner* — Wanda Z Russell
(74) *Attorney, Agent, or Firm* — Parker Ibrahim & Berg LLC; James M. Behmke; Stephen D. LeBarron

(57) ABSTRACT

A system and method changes a rate at which routing information is sent to increase it upon the detection of one or more events, maintaining the then current rate for an amount of time, or dropping it, otherwise.

25 Claims, 7 Drawing Sheets

(56) References Cited

U.S. PATENT DOCUMENTS

| | | | |
|---|---|---|---|
| 8,184,632 B1 | 5/2012 | Hui et al. | |
| 2002/0090949 A1 | 7/2002 | Stanforth | |
| 2002/0191573 A1 | 12/2002 | Whitehill et al. | |
| 2003/0128690 A1* | 7/2003 | Elliott et al. | 370/351 |
| 2004/0116141 A1 | 6/2004 | Loven et al. | |
| 2004/0219922 A1 | 11/2004 | Gage et al. | |
| 2005/0249122 A1 | 11/2005 | Wheeler et al. | |
| 2006/0215588 A1 | 9/2006 | Yoon | |
| 2006/0221927 A1* | 10/2006 | Yamada et al. | 370/345 |
| 2007/0121503 A1 | 5/2007 | Guo et al. | |
| 2008/0095075 A1 | 4/2008 | Monier | |
| 2009/0190481 A1 | 7/2009 | Kobayashi et al. | |
| 2009/0310578 A1* | 12/2009 | Convertino et al. | 370/338 |
| 2012/0224487 A1 | 9/2012 | Hui et al. | |

OTHER PUBLICATIONS

Non-final Office Action issued Jul. 15, 2010 in U.S. Appl. No. 12/290,848, 14 pages.
Notice of Allowance issued Feb. 24, 2012 in U.S. Appl. No. 12/290,848, 8 pages.
Non-final Office Action issued Sep. 26, 2013 in U.S. Appl. No. 13/476,716, 17 pages.
Non-final Office Action issued Feb. 18, 2011 in U.S. Appl. No. 12/290,843, 18 pages.
Non-final Office Action issued Jul. 12, 2010 in U.S. Appl. No. 12/290,843, 18 pages.
Non-final Office Action issued Nov. 21, 2012 in U.S. Appl. No. 12/290,822, 21 pages.
Final Office Action issued Feb. 16, 2011 in U.S. Appl. No. 12/290,822, 15 pages.
Non-final Office Action issued May 26, 2010 in U.S. Appl. No. 12/290,822, 12 pages.
Notice of Allowance issued Jul. 8, 2013 in U.S. Appl. No. 12/290,822, 10 pages.
Non-final Office Action issued May 23, 2011 in U.S. Appl. No. 12/290,850, 15 pages.
Final Office Action issued Sep. 15, 2011 in U.S. Appl. No. 12/290,850, 11 pages.
Non-final Office Action issued Feb. 29, 2012 in U.S. Appl. No. 12/290,850, 12 pages.
Final Office Action issued Aug. 14, 2012 in U.S. Appl. No. 12/290,850, 12 pages.
Non-final Office Action issued Apr. 22, 2013 in U.S. Appl. No. 12/290,850, 12 pages.
Notice of Allowance issued Aug. 21, 2013 in U.S. Appl. No. 12/290,850, 8 pages.

* cited by examiner

SYSTEM AND METHOD FOR PROVIDING ROUTE INFORMATION

CROSS-REFERENCE TO RELATED APPLICATIONS

This application is a continuation of U.S. application. Ser. No. 12/290,850, filed Nov. 3, 2008, and claims the benefit of U.S. Provisional Patent Application Ser. No. 61/001,634 entitled, "Method and Apparatus for Providing Route Information" filed on Nov. 1, 2007 by Jonathan Hui, Alec Woo and David Culler, and is related to the subject matter of U.S. Provisional Patent Application No. 61/001,520 entitled, "Method and Apparatus for Managing Entries on a List of Routing Information" filed on Nov. 1, 2007 by Jonathan Hui, Alec Woo and David Culler, U.S. patent application Ser. No. 12/290,848 entitled "System and Method for Accepting Information From Routing Messages Into A List" filed Nov. 3, 2008 by Jonathan Hui, Alec Woo and David Culler, U.S. patent application Ser. No. 12/290,843, entitled, "System and Method for Managing a List of Entries Containing Routing Information" filed Nov. 3, 2008 by Jonathan Hui, Alec Woo and David Culler, and U.S. patent application Ser. No. 12/290,822 entitled, "System and Method for Computing Cost Metrics for Wireless Network Links" filed Nov. 3, 2008 by Jonathan Hui, Alec Woo and David Culler, ail of which are incorporated herein by reference in its entirety.

FIELD OF THE INVENTION

The present invention is related to computer software and more specifically to computer software for providing route information.

BACKGROUND OF THE INVENTION

Route information in a computer network is identified by various devices in the network in order to efficiently route messages. Route information includes a number of devices through which a message will travel to reach its intended destination. The transmission of a message from one device to another device is referred to as a "hop", and each routing device is referred to as a "node" in the network.

Routing information in a conventional wired network will change as the physical capabilities of the network change, due to additions or removal of equipment, equipment failure and misconfiguration, and wiring interruptions, removals or connection errors.

Each node in a wired network reports status or status changes by sending routing messages to other nodes in the network. The other nodes identify the best routes by which to send communications to potential destinations using such routing messages, and if a communication arrives, it is forwarded to the node in the direction of the destination that is next in line along that best path. In conventional wired networks, routing messages containing routing information are sent from a node to its neighbor nodes when changes are detected, and may be sent at other times.

Wireless networks in which some or all of the devices are mobile may have bandwidth and power constraints that do not match those of a wired network.

What is needed is a system and method that can use the bandwidth and power required for routing messages more efficiently.

SUMMARY OF INVENTION

A system and method in which nodes communicate with one another wirelessly, potentially through other nodes, allows each node to wirelessly send a beacon containing routing information to its neighbor nodes. The beacons are originated and broadcast according to a rate. Each device detects whether the network has recently changed. If not, the system and method lowers the beacon rate to conserve power and bandwidth. The lowering may be made gradually or abruptly using any conventional function: exponential, stair step, etc.

The beacons are used to identify the best path through the network to each destination node, of which there may be one or more in the network. Each beacon sent by a node identifies a cost of reaching one or more destination nodes using the node that sent the beacon. The cost of reaching a destination node may be a function of the number of hops to the destination and the number of retries required to successfully traverse a hop in one embodiment. Each node reachable from a given node in the path to a destination device that does not or may not route in a path back to that node when sending a message is referred to as the next hop node of the particular node, though any node that provides a route to a destination may qualify as a next hop node.

The beacon rate can be increased, up to a maximum based on events that occur in the network. Such events include detection that the number of next hop nodes has dropped below a threshold, having been above that threshold, indicating that the network is changing in a way that could benefit from increasing the beacon rate.

The beacon rate can be increased, up to a maximum, in response to receipt of a message to do so. Such a message can be transmitted automatically by the destination node (or another node) to nearby nodes and flooded to other nodes, for example, because the destination node has instructed some or all of the nodes to move, thus potentially reconfiguring the network, or the message can be transmitted by a human to the destination.

The beacon rate for a device can be increased when the device identifies at least its first next hop node up from zero, indicating that the network is changing in ways likely to make the increased beacon rate worthwhile. Alternatively, the beacon rate can be increased for a while when the number of nodes identified by a device drops to zero, from a number above zero.

The beacon rate can be increased when an inconsistency is identified between the cost of using a node that the node itself maintains, and the cost that using such node is believed to incur. Such an identification can occur when a node sends a communication to another node, by the sending node also including in the communication, the cost the sending node believes the receiving node incurs in sending the communication to the destination node. The receiving node compares the cost from the sending node to the cost it maintains, and if there is a discrepancy, or there is a discrepancy above a threshold measurement, the receiving node will increase its beacon rate.

The beacon rate can be increased if a hop count in the beacon increases from what was last received for that node (or that node and destination), or if such an increase is substantial (e.g. more than ten or twenty percent). The beacon rate can be increased if the hop count of reaching a destination is not less than, or is not less than or equal to, the hop count the receiving node would advertise, or would advertise to the destination in the beacon.

Each time one of the above occurs, the beacon rate can be increased according to a function, such as by increasing the beacon rate by twice its current value, up to a maximum.

Some events may cause the beacon rate to immediately increase to the maximum, such as if the destination instructs the node to do so.

Because beacon messages are sent more frequently when a routing change is likely to have occurred or when the benefits of doing so are great, and less frequently at other times, power is conserved, yet the impact on performance in the network is minimized.

DETAILED DESCRIPTION OF A PREFERRED EMBODIMENT

Figure 1:
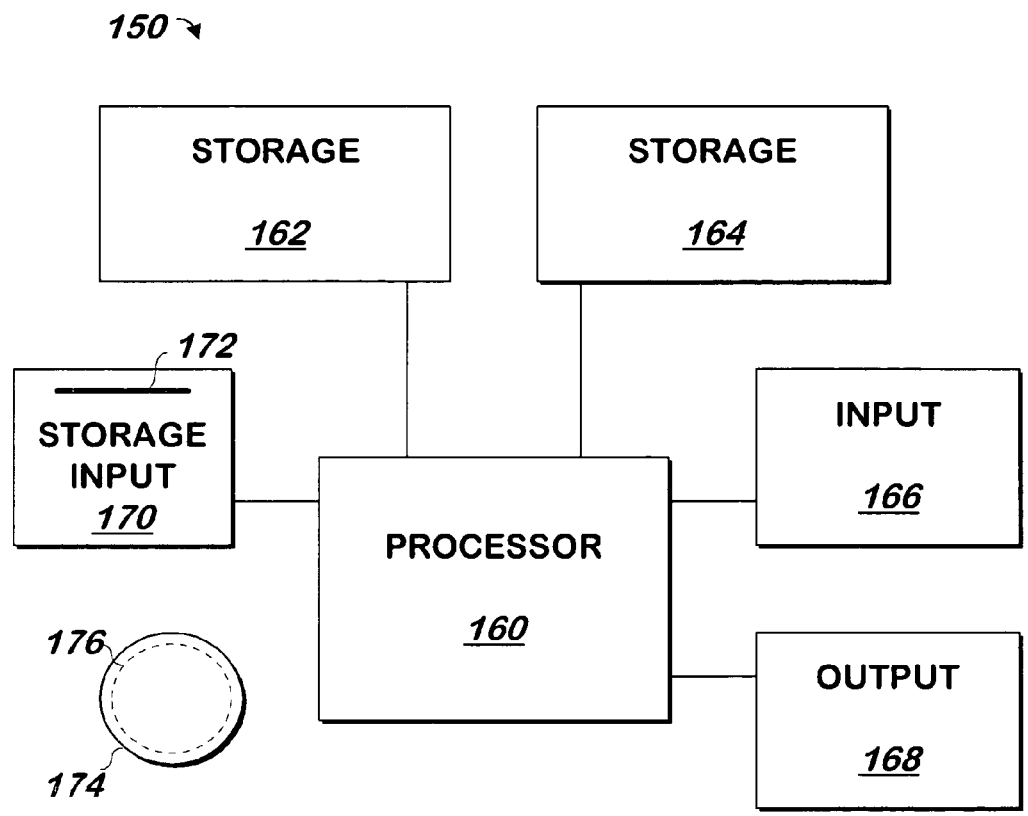
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE INCORPORATED of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used. In one embodiment, systems may be based on the conventional MSP430 commercially available from Texas Instruments, Inc., of Dallas, Tex., or the atmega128 commercially available from Atmel Corporation, of San Jose, Calif., or the PXA xscale commercially available from Intel Corporation of Santa Clara, Calif. Such systems may run the conventional TinyOS, commercially available from the web site of SourceForge.net or another operating system, such as a real time operating system.

FIGS. 2A, 2B, 3 and 4 are a flowchart illustrating a method of sending routing information according to one embodiment of the present invention. Referring now to FIGS. 2A, 2B, 3, and 4, as part of an initialization process a beacon rate is set to a maximum, or a different value, such as a minimum beacon rate, an optional hysteresis counter is set to zero, a next hop threshold indicator is indicated as the number of next hops not having met a threshold, and a first next hop indicator is set to indicate the first next hop is not present 210. The method continues at step 212 and at step 220.

At step 212, which may occur as an independently running process, a communication is received wirelessly and the type of the communication is identified. In one embodiment, the type of the communication is identified using a flag in the communication, an operation code in the communication, or other conventional methods. If the communication received in step 212 is a beacon 214, the method continues at step 304 of FIG. 3. If the communication is a message to be routed 214, the method continues at step 410 of FIG. 4. If the communication is a management message 214, such as command from a gateway or destination to increase the beacon rate in order to more rapidly build a new version of the next hop list, or in one embodiment if the communication is a request to send a beacon 214, the method continues at step 242 of FIG. 2B. In one embodiment, if the type of the communication is a request to provide a beacon or a management message 214, the method continues at step 248 of FIG. 2B, as shown by the dashed line in FIG. 2B, or in a third embodiment, the method continues at both step 242 and at step 248 for such message types. The various foregoing steps and their subsequent steps are described in more detail below.

As noted, after the initialization step 210, the method also continues at step 220. At step 220, using the beacon rate set in step 210 or elsewhere as described herein, a timer is set to notify at a time in the future. The amount of time to which the timer is set is a function of the inverse of the beacon rate. The timer may be set using a conventional operating system or other conventional manners of receiving a timer signal at the expiration of the timer period. The timer signal is received 222, and any next hop nodes are identified using any stored beacon information 224.

In one embodiment, a next hop node is the first node in a path from a device performing the method of the present invention, to a destination device such as a gateway or other destination of a message, provided that the node has indicated it can reach the device and/or vice versa, and the node does not route messages received in a path through the device as described in more detail in the related applications. The first node is the node farthest from the destination device and nearest to such device. The identifiers of next hop nodes may be stored along with the paths corresponding to each such next hop node, as described in more detail herein and below and in the related applications. Briefly, in one embodiment, beacons are received from other nodes performing a function at least similar to the method described in FIGS. 2, 3, and 4, and each beacon contains a list of identifiers of nodes in the path to the destination from the node that generated the beacon. In one embodiment, a node is a next hop node if the list received from that node does not include an identifier of the node performing the method of the invention.

Figure 2A:
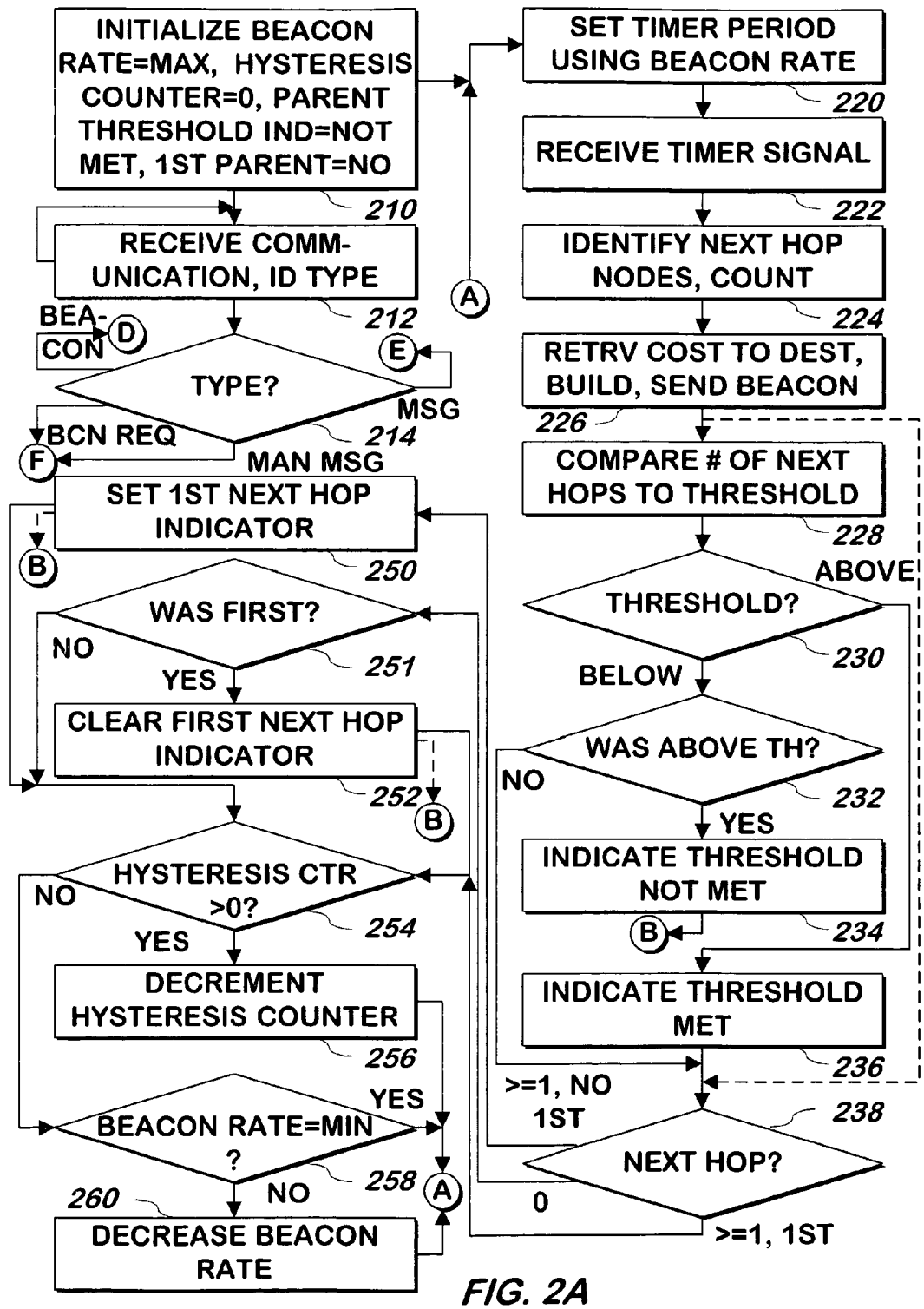
FIGS. 2A, 2B, 3 and 4 are a flowchart illustrating a method of sending routing information according to one embodiment of the present invention.
Figure 3:
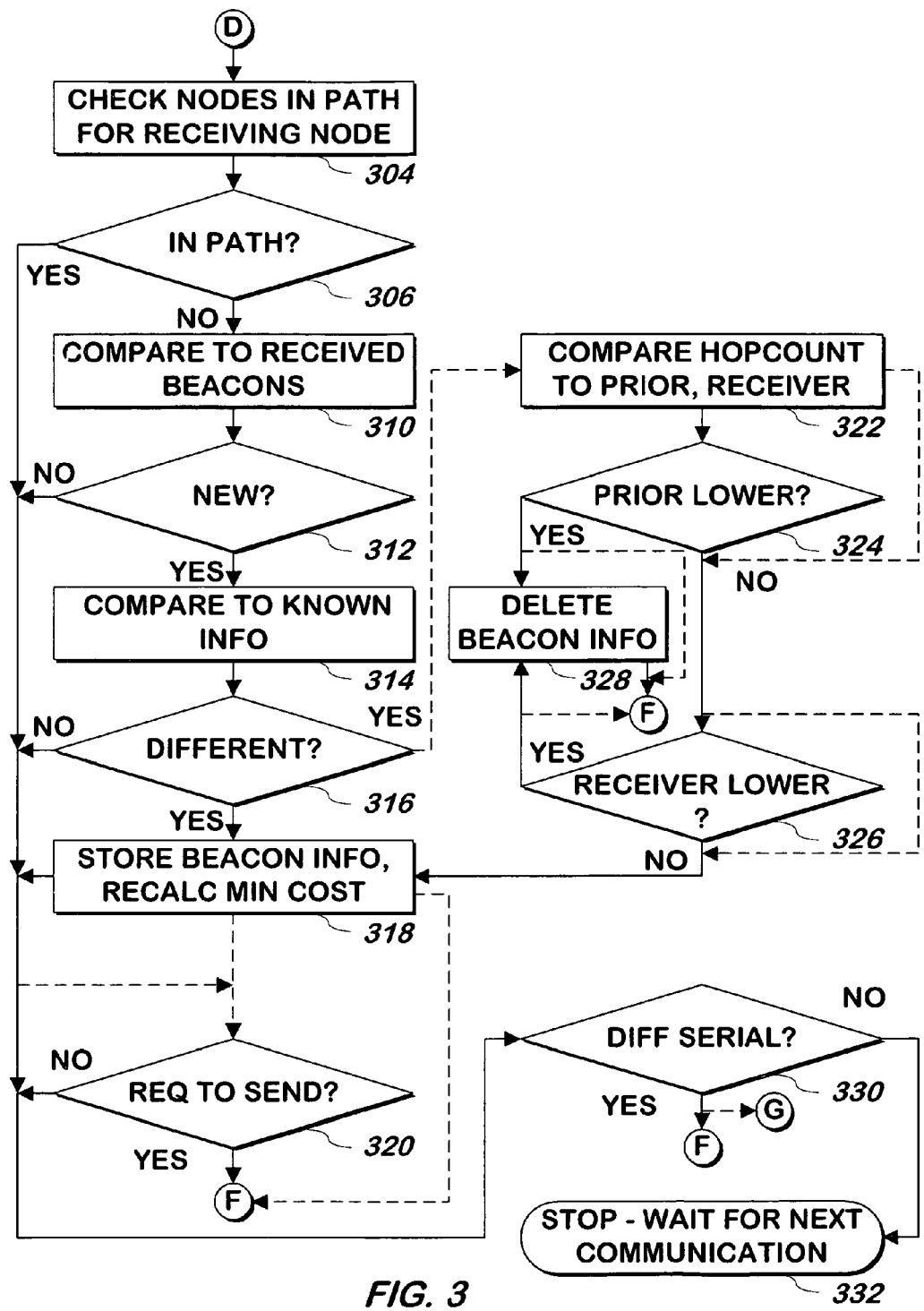
Figure 4:
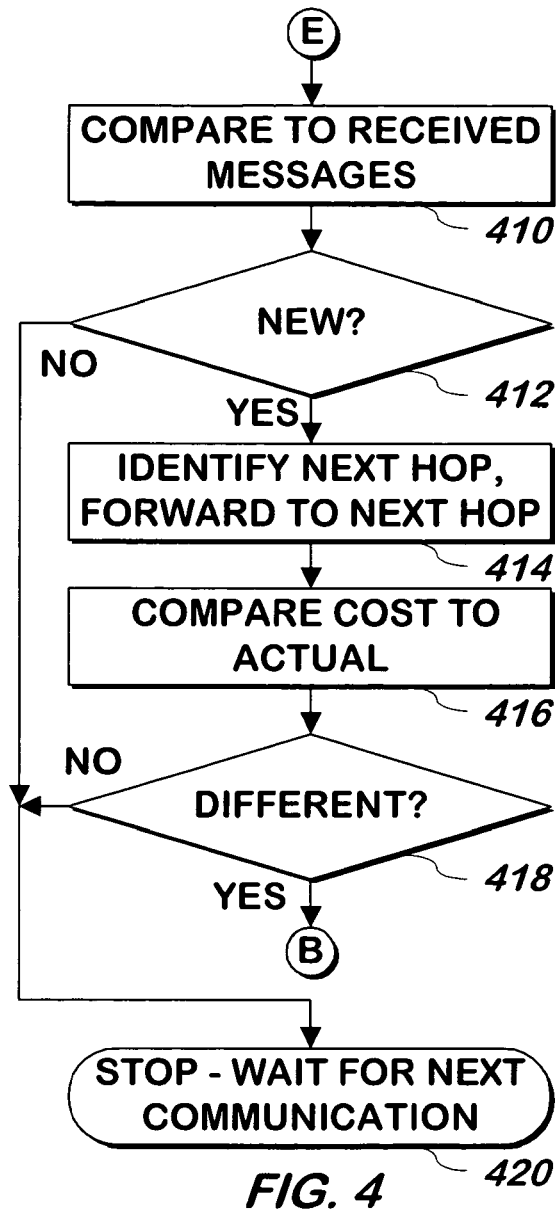

A cost of sending a message to the destination is identified using the beacon information, and a beacon is built and sent 226, for example wirelessly via a radio to the one or more other nodes that are performing a function similar to the method described in FIGS. 2, 3 and 4. In one embodiment, the cost of sending a message to the destination is a function of the number of hops to the destination, i.e. one plus the number of nodes between the device sending the message and the destination and the number of messages each hop requires to successfully receive a message as described in more detail in the related application. The beacon includes the identifier of that sending device and the destination, and the identifiers of a number e.g. four, of the first nodes in the best path from the node that sent the beacon to the destination.

In one embodiment, there may be more than one destination reachable by any node. In such embodiment each beacon may contain information for multiple destinations or multiple beacons may be sent by a node for each destination reachable by the node.

In one embodiment, for example if a request flag has been set in a previous iteration of step 240 as described herein and below, the beacon sent in step 226 includes the set flag to indicate that the recipient of the beacon should quickly respond with a beacon of its own, and the request flag is cleared. If the flag has not been set, the cleared flag may be sent as part of the beacon sent in step 226.

In one embodiment, step 226 is followed by step 238, as indicated by the dashed line in the Figure. In this embodiment, no threshold is employed other than the optional number of next hops check described herein and below.

In another embodiment, step 226 is followed by step 228, and at step 228, the number of next hop nodes is compared to a threshold. In this embodiment, if the number of next hops is below the threshold 230, a next hop threshold indicator is further investigated and the method continues at step 232. Otherwise 230, the next hop threshold indicator is set to indicate that the threshold has been met 236, and the method continues at step 238, described below.

At step 232, if the next hop threshold indicator is set, thereby indicating the threshold number of next hops had been met but that the number of next hops is now below the threshold (because the "below" branch of step 230 had been taken), the next hop threshold indicator is reset to indicate the threshold has not been met 234, and the method continues at step 240 of FIG. 2B. Otherwise 232, the method continues at step 238.

Number of Next Hops Falling to Zero.

At step 238, if there are no next hops, and if the first next hop indicator is not set to indicate that a first next hop has been identified 251, the method continues at step 254. Otherwise, if the first next hop indicator indicates that a first next hop has been identified 251, the first next hop indicator is reset to indicate there has been no first next hop identified 252. In one embodiment, the beacon rate is raised in such a case of the number of next hops falling to zero, and in this embodiment the method continues at step 240 of FIG. 2B, as indicated by the dashed line in the Figure. In another embodiment, the beacon rate is multiplied or lowered, in this case of the number of next hops falling to zero and in this embodiment the method continues at step 254.

Number of Next Hops Rising above Zero or Another Threshold.

If at step 238 there are one or more next hops and the first next hop indicator indicates that no first next hop has been identified, the first next hop indicator is set to indicate that the first next hop has been identified 250. In one embodiment, the beacon rate is raised in such a case of the number of next hops rising above zero, and in this embodiment the method continues at step 240 of FIG. 2B, as indicated by the dashed line in the Figure. In another embodiment, the beacon rate is maintained or lowered in such a case of the number of next hops rising above zero, and in this embodiment the method continues at step 254.

If there are one or more next hops and the first next hop indicator is already set to indicate that a first next hop has been found 238, the beacon rate is maintained or lowered, and in this embodiment the method continues at step 254. Thresholds other than zero may be used in a similar fashion to the zero threshold identified as described above.

At step 254, the optional hysteresis counter is checked to determine if it is greater than zero or zero, and if greater than zero, the hysteresis counter is decremented 256 and the method continues at step 220. If the hysteresis counter is not greater than zero, and if the beacon rate is set to the minimum 258, the method continues at step 220, and otherwise 258, the beacon rate is decreased 260 and the method continues at step 220. The beacon rate may be decreased using any conventional function, such as a straight line, exponentially decaying function, or a stair step function. In the embodiments in which the hysteresis counter is not used, steps that continue at step 254 instead continue at step 258, and steps 254-256 are not used.

Figures 2B, 5:
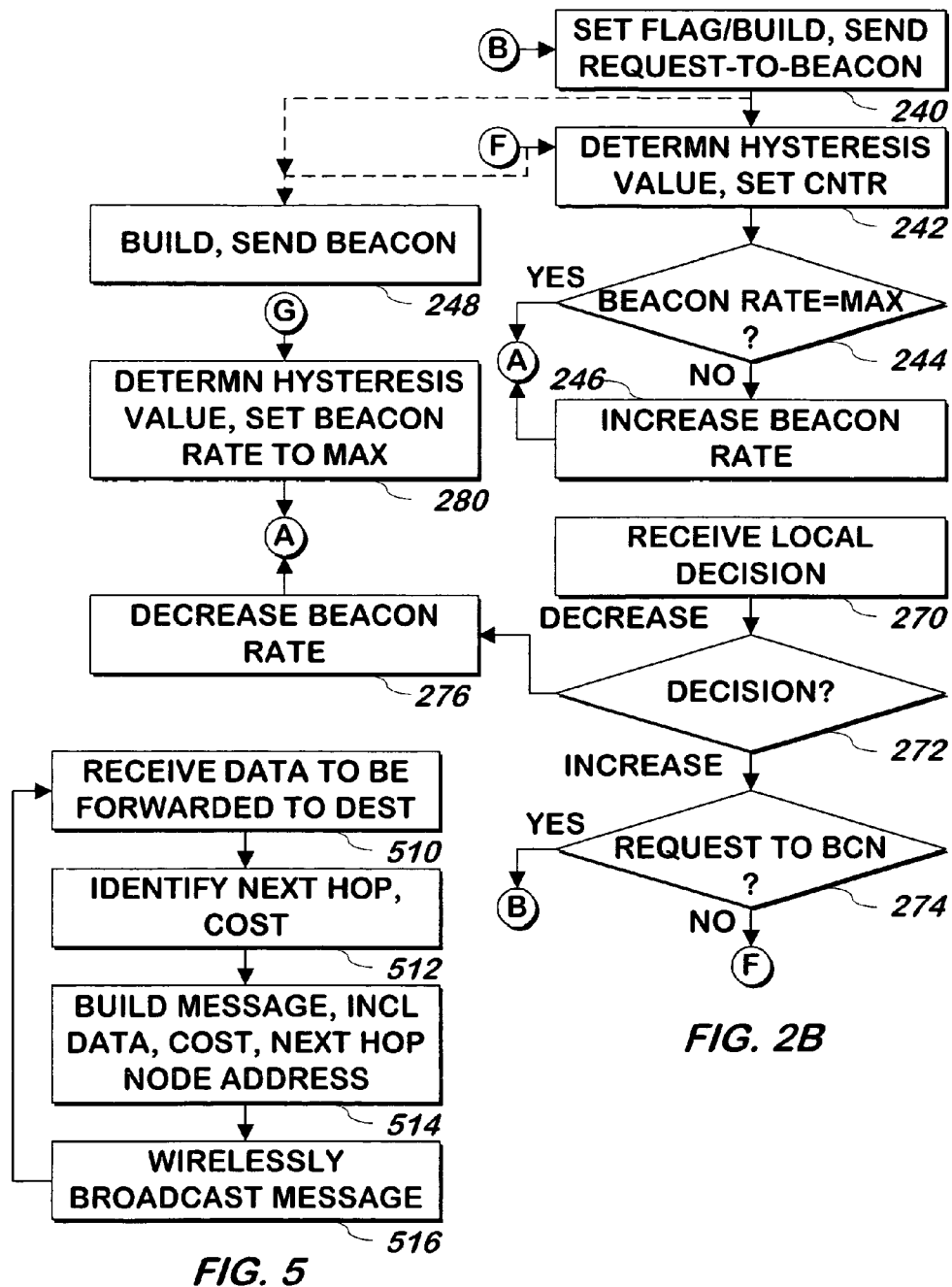
FIG. 5 is a flowchart illustrating a method of sending to a destination device data that was originated in the sending device according to one embodiment of the present invention.

As noted herein some steps continue at step 240 or 242 of FIG. 2B. At step 240 of FIG. 2B, in one embodiment a request flag is set that will cause a request to send a beacon to be included in the beacon built in the next iteration of step 226, or at step 248, described below. In another embodiment, a separate request-to-beacon message is built and sent, for example wirelessly via a radio to one or more other nodes that are performing a function similar to the method described in FIGS. 2, 3 and 4. In one embodiment, the method continues at both step 242 and at step 248.

At step 242, a hysteresis value is determined and the hysteresis counter is set to that value. In one embodiment, the hysteresis value may be determined depending on the number of next hops identified, or depending on the event that caused the method to reach step 242: for example, the hysteresis counter may be set to a different value if the first next hop indicator was just cleared than if the first next hop indicator was just set.

If the beacon rate is equal to the maximum beacon rate 244, the method continues at step 220 of FIG. 2A. Otherwise 244, the beacon rate is increased 246, and the method continues at step 220 of FIG. 2A. In one embodiment, the beacon rate is increased using any conventional functions such as exponential or a step function and the function may be based on the cause of the raising of the beacon rate.

At step 248, a beacon is built and sent, for example wirelessly via a radio in a manner at least similar to that described herein and above. In one embodiment, for example if a request flag has been set, the beacon indicates that the recipient of the beacon should respond with a beacon of its own, as rapidly as possible, and the request flag is cleared as part of step 248. In one embodiment, a set request flag is only cleared when the beacon rate reaches the minimum rate as part of step 258.

As described herein, each beacon may include a sequence number, which remains constant from one beacon to the next, until a change is desired by a destination or other device, including a change to the beacon rate, though other changes may be specified in the beacon, such as an instruction to discard routing information from prior sequence numbers. The destination node or another node will increment the sequence number it broadcasts when such change is desired.

As described herein, various events are detected and used to raise or lower the beacon rate, or optionally adjust a hysteresis countdown counter, that otherwise maintains the beacon rate. Other embodiments use a counter to gradually increase the beacon rate before allowing it to either level off, then fall or to fall.

Two of the events described above, the number of next hops falling to zero, or the number of next hops rising to one, are set forth in specific examples below.

In the embodiment in which multiple destinations are possible, the steps described above may be performed for each destination. If separate beacons are sent for each destination, each destination will have its own beacon rate, or the beacon rate may be calculated for each destination as described above, and the maximum rate may be used for all beacons, or for a single beacon.

Receiving a Beacon

Referring now to FIG. 3, as noted above, when a beacon is received, the method continues at step 304. At step 304, the list of node identifiers in the path between the node that generated the beacon and the destination, contained in the beacon as described herein, is investigated to determine whether the identifier of the device receiving the beacon is included in the list. If so 306, the method continues at step 330.

Otherwise 306, the beacon is compared to previously received beacons originating from the same node to determine if the beacon is new or if it had been previously received 310. If the beacon has been received before 312, the method continues at step 330, although in one embodiment a timestamp corresponding to such information may be updated to the current time. Otherwise 312, if the beacon is new, the information in the beacon, for example the cost of reaching the destination from the node that originated the beacon (e.g. the hop count), is compared to any known information about the node that sent the beacon 314. If the information in the beacon is different from that which had been known 316, or if no information was previously known for that node, the identifier of the node that originated the beacon is stored along with the path list included in the beacon, and the cost of using the node from which the beacon was received to send a message to the destination is computed 318. Although in one embodiment, the cost is computed as described in the related application, in one embodiment, that the cost is the hop count, the cost of using that node may for example be determined by adding '1' to the cost of the received beacon. The related application adds to the cost advertised in the received beacon an average or estimated number of times a message is sent to the node sending the beacon to have the message received to identify the cost of routing messages through the node. In one embodiment, storage of the beacon information replaces the older beacon information from the same node, and may include a timestamp that is received from an operating system. In one embodiment, as part of step 318, any stored beacon information associated with a timestamp that has passed beyond a threshold amount of time, for example, a timestamp ten minutes or more in the past, is discarded or ignored. The method continues at step 330.

In one embodiment, step 242 also follows step 318. Thus, if the information in the beacon is different from prior information received from the node corresponding to the beacon, the beacon rate will be increased if it is not already at the maximum rate, and the hysteresis counter will be adjusted up if it is not already at the maximum, for example to the maximum. The first beacon from a device will take the yes branch of steps 312 and 316.

In one embodiment, each beacon contains a hop count, or the count of the number of hops from the device that sent the beacon to the destination, which may be implied or specified in the beacon. In one embodiment, step 322 follows the yes branch of step 316 instead of step 318. In step 322, the hop count from the beacon is compared against the hop count previously stored for the device from which the beacon was received (and optionally, the destination), against the hop count for the device receiving the beacon, or both of these.

In one embodiment, if the hop count is larger than the previously stored hop count for the sending device (or sending device and destination) 324, the method continues at step 242 of FIG. 2B. In one embodiment, the method continues at step 242 only if the hop count is significantly larger (e.g. by more than ten or twenty percent) than the previously stored hop count. Otherwise 324, the method continues at step 318. In one embodiment, step 324 is not performed, and step 326 follows step 322.

At step 326, if the receiving device has a lower hop count or lower hop count (or hop count to the destination specified in the beacon) than the hop count in the received beacon, or the receiver has a hop count (or hop count to the destination specified in the beacon) that is lower than or equal to the hop count in the received beacon, the method continues at step 242 of FIG. 2B, and otherwise 326, the method continues at step 318. In one embodiment, step 318 follows the "no" branch of step 324 and step 326 is not used. In one embodiment, before continuing to step 242, following the yes branch of steps 324 or 328, the stored beacon information for the device that sent the beacon (and optionally the destination or the destination that corresponded to such "yes" branch) is deleted 328 from storage so that the information from the beacon is not used to send data.

At step 330, if the beacon has a serial number different from the prior serial numbers, the method continues at step 242 or 280 and otherwise 330, the next communication is waited for 332. Because step 212 operates as a continuously and independently running process, and the timer of step 222 also triggers operation of the steps starting at step 222, nothing further needs to be done at step 330 to receive the next communication or to process the next timer event. At step 280, the beacon rate is increased to the maximum and the hysteresis counter is set to a value such as one or five, and the method continues at step 220.

In one embodiment, indicated by the dashed line in the Figure following step 318 and step 312, a determination is made as to whether or not the beacon received includes a request to send a beacon in response and if so 320, the method continues at step 248 and/or step 242 of FIG. 2B. Otherwise 320, the method continues at step 330.

If multiple beacons are received from the same device for different destinations, the method of FIG. 3 will be performed for each beacon. If a single beacon is used, the yes branch of steps 324 or 326 or both can be performed if the hop count for any destination in the beacon satisfies the tests described above.

Messages to be routed to a destination may be received as described herein and above. Referring now to FIG. 4, if such a message is received, the method continues at step 410. At step 410, the message is compared to previously received messages to determine whether or not the message has been received before, and is therefore new or not new. If the message is not new 412, the method continues at step 420. Otherwise 412, the next hop corresponding to the lowest cost path to the destination of the message is identified, and the message is forwarded towards the destination by forwarding the message to that next hop 414. The destination may be a destination device that is the implicit destination of all messages to be routed or it may be specified in the message. It is noted that the destination itself could be a next hop in one embodiment of the present invention, and thus, messages may be forwarded to the destination by sending the message to the next hop.

In one embodiment, the message received will contain the hop count or other cost that the sender of that message believes the recipient to incur in sending messages. Such cost received is compared to the actual cost required to send a message to the destination currently known by the receiving device 416. If the two costs are different 418, the method continues at step 240 or step 242, and optionally step 248 of FIG. 2B, and otherwise 418, the method continues at step 420. In such embodiment, the message sent in step 414 also includes the cost received from that next hop from its beacon.

At step 420, the method terminates, allowing the independently running process of step 212 and the timer signal of step 222 to continue the operation of the method as described above.

Any number of communications may be received in this fashion and processed as described herein, and timer signals may continue to be received and processed as described herein.

Referring now to FIG. 5, a method of sending to a destination, data that was originated in the sending device is shown according to one embodiment of the present invention. The data to be forwarded to the destination is received 510. The next hop or next hops of the lowest cost route, and the cost associated with sending from that next hop or those next hops, are identified 512. Ties may be broken at random if more than one next hop has the same lowest cost. A message including the data received in step 510, the cost identified in step 512, and the address of the next hop identified in step 512 is built 514, and the message is wirelessly broadcast 516. The method continues at step 510.

Increasing the Beacon Rate: Two Examples.

A number of different embodiments are shown by the various dashed lines in FIGS. 2, 3, and 4, as described herein and above, because the invention allows for the beacon rate to be increased or decreased in response to different triggering events. For the sake of example, two embodiments wherein the beacon rate is increased in response to two different triggering events will now be discussed in more detail.

In the first example, the beacon rate is increased and then maintained for several beacon periods whenever zero next hops are identified after one or more next hops had previously been identified, but is lowered when one or more next hops are identified, and also lowered when zero next hops are identified when zero next hops had previously been identified. In other words, in this embodiment, when a device falls out of contact with next hop nodes, it will initially increase its attempts to advertise its own presence and to locate next hop nodes by raising the beacon rate and requesting beacons in response. However, when the device has identified at least one next hop node, or when the device has determined that no next hop nodes are in the vicinity, the device will lower the beacon rate, which may conserve power and/or decrease traffic on communication channels.

In this embodiment, when zero next hops are identified at step 238, if at step 251 zero next hops had previously been identified, the "no" branch of step 251 will be taken and the beacon rate will be maintained or lowered, depending on the value of the hysteresis counter in effect at the time. Otherwise, the "yes" branch of step 251 will be taken, step 252 will be followed by step 240, and the beacon rate will be raised. In this embodiment, when one or more next hops are identified at step 238, the method will continue at step 254 or at step 250 depending on whether the first next hop indicator has been set. However, in this embodiment, step 250 is followed by step 254, so that both outcomes will ultimately cause the beacon rate to be lowered at step 260. The hysteresis counter may be set to a value, such as ten, at step 242 after the detection of zero next hops has occurred when the first next hop indicator was set. This will serve to hold the beacon rate at the higher level for a period, before it drops down. Step 250 could clear the hysteresis counter in this case, so that when the first one or more next hops were found, the beacon rate would start to drop at that point.

In the second example, the beacon rate is increased whenever at least one next hop is identified after zero next hops had previously been identified, but is lowered in other cases. In other words, in this embodiment, when a device comes into contact with next hop nodes for the first time, it will initially increase the beacon rate in order to announce itself and solicit information about the next hop nodes. However, as the device remains in contact, or when the device drops out of contact, the beacon rate will gradually be lowered.

In this embodiment, if at step 238 zero next hops are identified, the beacon rate will be decreased, subject to any hysteresis counter reaching zero. In this embodiment, step 238 is followed by step 251, which may be followed by either step 252 or step 254. However, in this embodiment, step 252 is followed by step 254, causing both branches of step 251 to ultimately lead either to reduction of the hysteresis counter at step 254 or decreasing the beacon rate at step 260. Similarly, at step 238 when one or more next hops are identified but it is determined that the first next hop indicator has already been set, in this embodiment, the method will continue at step 254 and similarly lead to decreasing the hysteresis counter or the beacon rate. By contrast, when one or more next hops are identified at step 238 but it is determined that the first next hop indicator is not set, in this embodiment the method will continue at step 250, and step 250 will be followed by step 240, ultimately causing the beacon rate to be increased at step 246.

It is noted that each of the events that raise the beacon rate may be encountered multiple times during operation of the system and the method. Thus, the beacon rate is raised each time such event is encountered, even after it has been encountered before.

It is additionally noted that the two examples described above may be combined, allowing the beacon rate to be increased whenever a device comes into contact with a next hop node after being out of contact, or loses contact with all next hop nodes after establishing contact. Additionally, discovery of a different number of next hop nodes (other than one or zero) may be used as the triggering event for raising or lowering the beacon rate, for example through use of the optional threshold and/or by changing the "first next hop indicator" to a "second next hop indicator" and the check at step 238 to a check for two or more next hops, or for corresponding other numbers of next hops. In this manner, the invention may be adapted for use in multiple environments where different device behaviors may be desirable.

At any time, the device performing the method, which may be part of a mobile device, and may not be line powered, may determine that it wishes to change the beacon rate. In such embodiment, an application or process on the device may provide a notice to increase the beacon rate, and may optionally provide the value of the hysteresis counter to be set, and an indication whether a request to beacon should be provided. At FIG. 2B, if such a notice is received 270, if it indicates the beacon rate is to be increased 272, if the notice includes an indication that a request to beacon should be provided 274, the method continues at step 240 and otherwise 274, the method continues at step 242. If the notice indicates that the beacon rate should be decreased 272, the beacon rate is decreased 276 and the method continues at step 220.

System.

Figure 6:
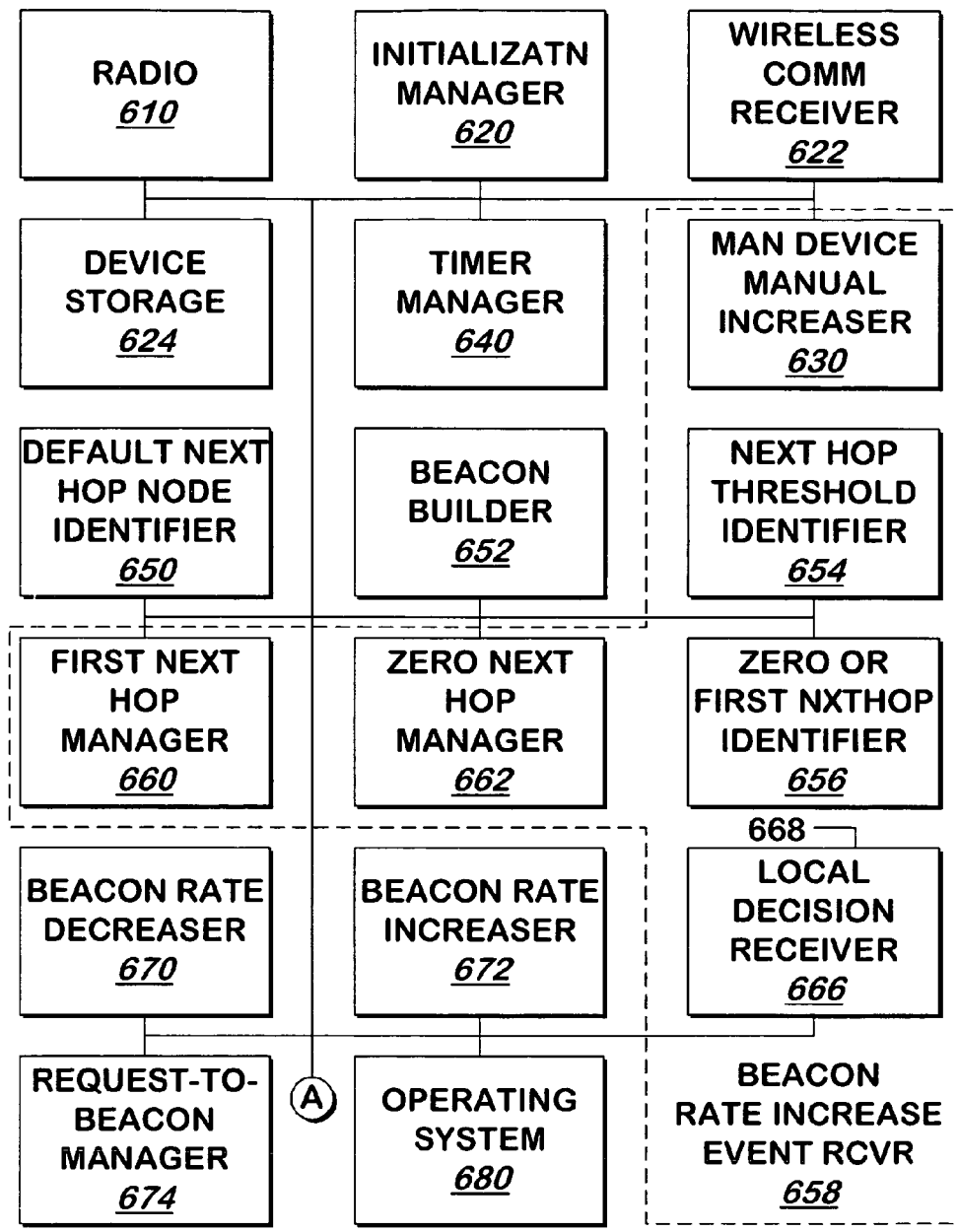
FIGS. 6, 7, and 8 are a block schematic diagram of a system for sending routing information and sending to a destination device data that was originated in the sending device according to one embodiment of the present invention.
Figure 7:
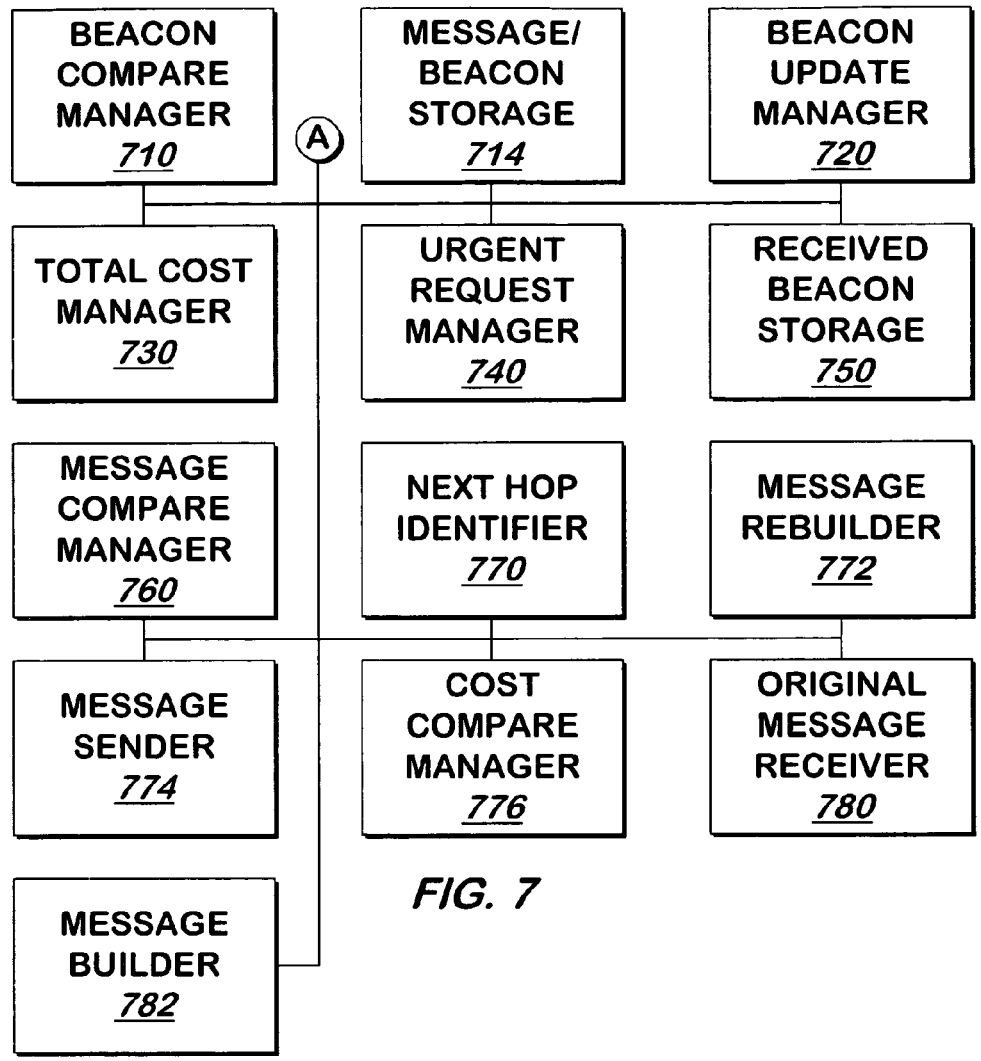
Figure 8:
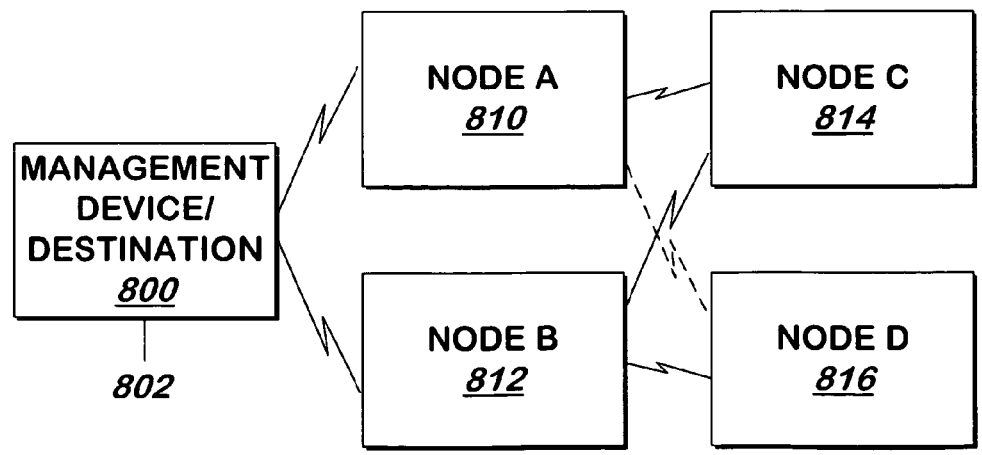

FIGS. 6 and 7 are a block schematic diagram of a system for sending routing information, according to one embodiment of the present invention. FIG. 8 shows four nodes 810, 812, 814, 816, each of which contains the system of FIGS. 6 and 7, and one management device/destination 800.

Management device/destination 800 is a node that receives communications and may direct nodes 810-816 as described herein. For example, management device/destination 800 may direct some or all of nodes 810-816 to move into new positions that are different from their old positions.

As described herein, management device/destination 800 also receives communications from nodes 810-816, for example, to forward them into network 802, which may include a local area network, such as an Ethernet network, coupled to a wide area network, such as the Internet. Nodes 814-816 forward messages to management device/destination 800 by sending them to nodes 810-812, which forward them to management device/destination 800, all wirelessly, as described in more detail in the related applications. Communications with the local area network 802 may be wired, and other communications among nodes 800-816 may be wireless. Although in this representative example four nodes 810-816 are shown, any number of nodes may be incorporated in other embodiments.

At system start up, management device/destination 800 broadcasts a beacon including a unique management device/destination identifier and advertising a advertised cost of zero. The beacon is received and processed by each node in communication with management device/destination 800, i.e. node A 810 and node B 812. As described in more detail herein and below, when nodes 810 and 812 receive the beacon, each of these nodes generates and broadcasts a beacon of its own, including the node identifier of that node and a advertised cost associated with that node, which may for example be the advertised cost received from management device/destination 800 plus the cost for that node to send a message to management device/destination 800. Such beacons are received by nodes 814 and 816, which proceed similarly, and each node 810-816 thereafter each periodically broadcasts one or more beacons of their own, and uses the beacon information received from other nodes to route data to management device/destination 800 as described in more detail herein and below. It is noted that, although management device/destination 800 is disclosed as a single device, its functions may be performed by different devices. For example, there may be any number of destinations, and the management device may be a device that is separate from any destination.

FIG. 6 and FIG. 7 together illustrate a representative one of devices 810-816 according to one embodiment of the present invention. Referring now to FIGS. 6 and 7, at system start up, initialization manager 620 sets a beacon rate indicator to indicate a maximum beacon rate, and stores the beacon rate indicator in device storage 624. In one embodiment, device storage 624 includes conventional memory or disk storage. Initialization manager 620 also optionally sets a hysteresis counter equal to zero, and/or sets an optional next hop threshold indicator to indicate that a next hop threshold has not been met, and stores any such hysteresis counter and next hop threshold indicator in device storage 624. In addition, initialization manager 620 sets a first next hop indicator to indicate that a first next hop has not been found and stores the first next hop indicator in device storage 624. These activities may be performed for each destination identified in a received beacon in the embodiment in which multiple destinations are supported.

At any time, wireless communication receiver 622 may receive a communication, for example from management device/destination 800, a system administrator, or another node implementing the system described herein, via radio 610. In one embodiment, radio 610 is a conventional IEEE 802.15.x-compatible radio that provides some or all of the capabilities described by one or more 802.15.x specifications. Radio 610 transmits and receives data over a wireless network, though wired networks may also be used. Other radios and/or protocols may be used, such as the conventional 802.11a/b/g/h or other similar protocols.

In one embodiment, communications may be management messages, beacons, requests for beacons, or messages to be routed. In one embodiment, commands, beacons, and requests for beacons are sent on one channel or addressed to one destination, while messages are sent on another channel or addressed to another destination. In this embodiment, messages additionally may contain a unique node identifier of the node 810-816 to which the message is being sent, with each node having its own identifier unique to other nodes. Messages may instead contain a node identifier that corresponds to all nodes. In this embodiment, radio 610 internally stores the node identifier of the node in which radio 610 resides, and when a message is received, radio 610 discards the message unless the message is being sent to the node in which radio 610 resides or to all nodes.

Routing the Communications Received.

When wireless communication receiver 622 receives the communication from radio 610, wireless communication receiver 622 determines the type of the communication, for example using a flag in the communication, an operation code in the communication, or other conventional methods.

If the communication is a management message, wireless communication receiver 622 in one embodiment signals management device manual increaser 630. Additionally or alternatively, wireless communication receiver 622 may signal urgent request manager 740, which proceeds as described herein and below. The signals may include the destination corresponding to what was received.

If the communication is a message to be routed, wireless communication receiver 622 provides the message to message compare manager 760, which proceeds as described herein and below.

If the communication is a beacon, wireless communication receiver 622 provides the beacon to beacon compare manager 710, which proceeds as described herein and below.

Request for Beacons.

If the communication is a request for beacons, wireless communication receiver 622 in one embodiment sets the hysteresis counter stored in device storage 624 equal to a predetermined value, which may be any value, and may be the same as or different from the value to which other elements described herein may set the hysteresis counter as described herein, and also signals beacon rate increaser 672, which proceeds as described herein and below. Additionally or alternatively, wireless communication receiver 622 may signal urgent request manager 740. All signals described herein may include the destination corresponding to the beacon, and the hysteresis counter may be one that corresponds to the destination. The values used as described herein may correspond to the destination.

When so signaled, urgent request manager 740 builds and sends a beacon. To build the beacon, urgent request manager 740 uses beacon information that may be stored in received beacon storage 750, as described herein, to identify a advertised cost of sending a message to management device/destination 800, for example the number of hops required to reach management device/destination 800 as described herein and above. The above is an example of a beacon in one embodiment of the present invention. Beacons of other embodiments are described in more detail in the related applications. In one embodiment, if no beacon information is stored in received beacon storage 750, urgent request manager 740 does not build and send the beacon. Otherwise, urgent request manager 740 builds a beacon including the advertised cost, and also including the node identifiers of nodes in the path to management device/destination 800, which may be included in the beacon information stored in received beacon storage 750 as described in more detail herein and in the related applications, and also including the node identifier of the node in which urgent request manager 740 resides, which urgent request manager 740 may for example request and receive from radio 610. In one embodiment, radio 610 internally stores the node identifier, which may be received e.g. from a system administrator. When urgent request manager 740 has built the beacon, urgent request manager 740 broadcasts the beacon via radio 610.

Management Message Received.

As noted above, a message may be a management message. When signaled by wireless communication receiver 622 as described herein and above, management device/destination manual increaser 630 optionally sets the hysteresis counter stored in device storage 624 to a predetermined maximum (e.g. five), and also changes the stored beacon rate indicator to indicate the maximum beacon rate, if the beacon rate indicator does not currently indicate the maximum beacon rate. Management device/destination manual increaser 630 also signals timer manager 640, which proceeds as described herein and below.

Setting the Timer.

When signaled by management device/destination manual increaser 630, or by beacon rate decreaser 670, beacon rate increaser 672, or beacon update manager 720 as described herein and below, or at system startup, timer manager 640 sets a timer, for example using operating system 680. To set the timer, timer manager 640 locates the beacon rate indicator stored in device storage 624, and in one embodiment sets the timer as a function of the inverse of the beacon rate. When the timer expires, timer manager 640 signals next hop node identifier 650.

When so signaled, next hop node identifier 650 identifies the default next hop node as described in the related applications, using beacon information received from other nodes as described in the related applications. Such beacon information may be stored in received beacon storage 750 along with associated timestamps and the node identifiers of the next hop nodes from which the corresponding beacon information was received, as described in more detail herein and below and in more detail in the related application. In one embodiment, received beacon storage 750 includes conventional memory or disk storage, and may include a conventional database. When next hop node identifier 650 has identified the default next hop node, next hop node identifier 650 provides the node identifier(s) of the identified default next hop node, or an indication that no default next hop node was identified (for example, if no beacons have been received), to beacon builder 652.

When beacon builder 652 receives the node identifier(s) or the indication, beacon builder 652 uses the beacon information in received beacon storage 750 to identify the total cost of sending a message to the management device via the default next hop node, for example the number of hops required to reach the management device/destination as described herein and above, or as described in the related application, and the node identifiers of first N nodes in the path to the management device. Beacon builder 652 builds a beacon including the total cost and the list of node identifiers, and also including the node identifier of the node in which beacon builder 652 resides, which beacon builder 652 may for example request and receive from radio 610. In one embodiment, beacon builder 652 also checks device storage 624 for a request flag, and if the request flag has been set e.g. by request-to-beacon manager 674 as described herein, beacon builder 652 clears the request flag and includes in the beacon an indication that the recipient of the beacon should respond with a beacon of its own, as rapidly as possible. (Beacon builder 652 may increment the sequence number instead of setting the request flag in one embodiment.) When beacon builder 652 has built the beacon, beacon builder 652 broadcasts the beacon via radio 610.

In one embodiment, the beacon contains a sequence number. In one embodiment, beacon builder 652 sends its beacon with the highest sequence number the node has received or received from a device that would be expected to send different sequence numbers, in received beacon storage 750. In another embodiment, no sequence number is sent by beacon builder 652.

Determination of Beacon Rate Changes.

a. Number of Next Hop Nodes Rose above Threshold

In one embodiment, beacon builder 652 also provides the number of next hop nodes, or the indication that no next hop nodes have been received, to next hop threshold identifier 654. In another embodiment, next hop threshold identifier 654 is not used, and beacon builder 652 provides the number of next hop node identifiers or indication to zero or first next hop identifier 656, which proceeds as described herein and below.

When next hop threshold identifier 654 receives the number of identifiers or indication, next hop threshold identifier 654 compares the number of identifiers received to a predetermined threshold, for example, three. In this embodiment, if the number of next hop nodes identified is greater than the threshold, next hop threshold identifier 654 changes the next hop threshold indicator in device storage 624 (which is initialized to indicate that the threshold was not met) to indicate that the next hop threshold has been met, if the next hop threshold indicator does not currently so indicate, and next hop threshold identifier 654 provides the identifiers of any next hop nodes, or the indication that no next hop nodes were identified, to zero or first next hop identifier 656.

Otherwise, in this embodiment, if the number of next hop nodes identified is less than the threshold, next hop threshold identifier 654 determines whether the next hop threshold indicator in device storage 624 indicates that the next hop threshold had been met. If the next hop threshold indicates that the next hop threshold had not been met, next hop threshold identifier 654 provides the number of next hop nodes it received, or the indication that no next hop nodes were identified, to zero or first next hop identifier 656.

If the next hop threshold indicator indicates that the next hop threshold had been met (and the number of next hop nodes is less than the threshold—meaning the number of next hop nodes has fallen below the threshold) next hop threshold identifier 654 changes the next hop threshold indicator to indicate that the next hop threshold has not been met and signals request-to-beacon manager 674, which proceeds as described herein and below. In one embodiment, next hop threshold identifier 654 also provides the number of next hop nodes it received, or the indication that no next hop nodes were identified, to zero or first next hop identifier 656.

b. Zero Or One Next Hop Nodes.

i. Zero Nodes

If zero or first next hop identifier 656 receives the indication that no next hop nodes were identified from beacon builder 652 or from next hop threshold identifier 654, zero or first next hop identifier 656 signals zero next hop manager 662.

When so signaled, zero next hop manager 662 changes the first next hop indicator in device storage 624 to indicate that the first next hop has not been found, if the first next hop indicator does not currently so indicate and changes the zero next hop indicator in device storage 624 to indicate that zero nodes were found.

In one embodiment, zero next hop manager 662 signals request-to-beacon manager 674 if such changes are made. Prior to doing so, zero next hop manager may set a hysteresis counter in device storage 624 to a predetermined value, such as five.

In another embodiment, or if no change is required because the first next hop indicator already indicates that first next hop has not been found, zero next hop manager 662 signals beacon rate decreaser 670, which proceeds as described herein and below. Thus, the beacon rate is increased if the number of nodes falls to zero.

Otherwise, if zero or first next hop identifier 656 receives a number of next hop nodes greater than zero from beacon builder 652 or next hop threshold identifier 654, zero or first next hop identifier 656 checks the first next hop indicator stored in device storage 624. If the first next hop indicator indicates that a first next hop had already been found, zero or first next hop identifier 656 signals beacon rate decreaser 670, which proceeds as described herein and below. Otherwise, zero or first next hop identifier 656 signals first next hop manager 660.

c. First Next Hop Node

When so signaled, first next hop manager 660 changes the first next hop indicator in device storage 624 to indicate that a first next hop has been found (e.g. the number of next hop nodes has gone from 0 to 1 or more) and clears the indicator that zero next hop nodes had been found. Optionally, first next hop manager 660 may also set the hysteresis counter stored in device storage 624 to a predetermined value, which may be any value, such as five, and may be the same as or different from the value to which other actors may set the hysteresis counter as described herein. First next hop manager 660 also signals request-to-beacon manager 674, which proceeds as described herein and below, or in another embodiment signals beacon rate decreaser 670. Thus, the beacon rate is increased as the number of hops rises to one. In another embodiment, the beacon rate may be additionally or alternatively increased as the number of hops falls to one by the combination of zero or first next hop identifier 656 and first next hop manager 660.

d. Local Decisions.

As noted, at any time, the device containing the system of FIGS. 6 and 7 may elect to adjust the beacon rate from an application or separate process. In such embodiment, local decision receiver 666 receives such a decision via input 668, which may include a hysteresis counter value and an indication as to whether a request to beacon should be sent. If the request includes a hysteresis counter value, the hysteresis counter in device storage 624 is updated by local decision receiver 666 to be the value of the counter, or is updated if it is higher than the value of the counter. Local decision receiver 666 signals request-to-beacon manager 674 if the decision includes an indication that the request to beacon should be sent, and otherwise signals beacon rate increaser 672.

In one embodiment, local decision receiver 666, management device manual increaser 630, next hop threshold identifier 654, zero or first next hop identifier 656, first next hop manager 660 and zero next hop manager 662 are part of a beacon rate increase event detector 658, because they detect events that lead to an increase in the beacon rate.

Decreasing the Beacon Rate.

When signaled by next hop threshold identifier 654 or by zero next hop manager 662 as described herein and above, beacon rate decreaser 670 in one embodiment checks the hysteresis counter. In this embodiment, if the hysteresis counter is greater than zero, beacon rate decreaser 670 decrements the hysteresis counter, and signals timer manager 640, which proceeds as described herein and above.

If the hysteresis counter is zero, or in the embodiment that the hysteresis counter is not used, beacon rate decreaser 670 checks the beacon rate indicator stored in device storage 624. If the beacon rate indicator indicates that the beacon rate corresponds to a minimum beacon rate, beacon rate decreaser 670 signals timer manager 640, which proceeds as described herein and above. Otherwise, beacon rate decreaser 670 changes the beacon rate indicator to correspond to a decreased beacon rate. As described herein and above, the beacon rate may be decreased using any conventional function, such as a straight line, exponentially decaying function, or a stair step function. Beacon rate decreaser 670 also signals timer manager 640, which proceeds as described herein and above.

Indicating that a Beacon should be Returned.

When signaled by next hop threshold identifier 654, first next hop manager 660, zero next hop manager 662, or cost compare manager 776 as described herein, request-to-beacon manager 674 in one embodiment sets a request flag in device storage 624. In another embodiment, request-to-beacon manager 674 instead generates and broadcasts a request for beacons via radio 610. Such a request may be received by other nodes implementing the system of the invention and processed as described herein. When request-to-beacon manager 674 has set the flag or sent the request, request-to-beacon manager 674 signals beacon rate increaser 672, and optionally also signals urgent request manager 740, which proceeds as described herein and below.

Increasing the Beacon Rate.

When signaled by request-to-beacon manager 674 or by wireless communication receiver 622 as described herein and above, by beacon compare manager 710 as described herein and below or otherwise as described herein, beacon rate increaser 672 checks the beacon rate indicator stored in device storage 624. If the beacon rate indicator indicates that the beacon rate corresponds to a maximum beacon rate, beacon rate increaser 672 signals timer manager 640, which proceeds as described herein and above. Otherwise, beacon rate increaser 672 changes the beacon rate indicator to correspond to an increased beacon rate. In one embodiment, beacon rate increaser 672 uses a conventional function such as an exponential or step function to increase the beacon rate, and in one embodiment beacon rate increaser 672 may use one function when signaled by first next hop manager 660 and another function when signaled by just dropped identifier 658. Beacon rate increaser 672 also signals timer manager 640, which proceeds as described herein and above.

Determining Whether Beacon is from a Next Hop Node.

When beacon compare manager 710 receives the beacon from wireless communication receiver 622 as described herein and above, in one embodiment beacon compare manager 710 determines whether or not the beacon was received from a next hop node. In one embodiment, as described herein and above, beacons contain identifiers of nodes in the path to the management device/destination from the node that generated the beacon. In this embodiment, a node is a next hop node if the list of nodes in the path to the management device/destination from that node does not include the identifier of the node in which beacon compare manager 710 resides. Beacon compare manager 710 may for example request and receive the identifier of the node in which beacon compare manager 710 resides from radio 610 and/or may internally store that identifier. If beacon compare manager 710 determines that the beacon was not received from a next hop node, in one embodiment the system proceeds when another communication is received as described herein and above. In other embodiments, any node from which a beacon is received is considered a next hop node.

Otherwise, beacon compare manager 710 determines whether the beacon is new. As described herein and above, in one embodiment it is possible that a beacon may be received twice. In this embodiment, each beacon additionally includes the node or management device/destination identifier of the node or management device/destination that built the beacon. Beacon compare manager 710 compares the node/management device/destination identifier included in the received beacon to any node/management device/destination identifiers stored in message/beacon storage 714. In one embodiment, message/beacon storage 714 includes conventional memory or disk storage arranged as a conventional circular buffer. If the node/management device/destination identifier and the same contents included in the beacon are stored in message/beacon storage 714, in one embodiment beacon compare manager 710 determines that the beacon is not new, and discards the beacon. In this embodiment, the system proceeds when another communication is received as described herein and above.

Otherwise, if beacon compare manager 710 determines that the beacon is new, beacon compare manager 710 stores the node/management device/destination identifier and associated beacon in message/beacon storage 714, and provides the beacon to beacon update manager 720.

In one embodiment, when a new beacon is received, the beacon rate in the receiving device is increased. In such embodiment, if beacon compare manager 710 determines that the beacon is new, beacon compare manager 710 updates the hysteresis counter stored in device storage 624 to the maximum amount (e.g. two or three or five or ten) and signals beacon rate increaser 672.

Determining Whether Received Beacon Requests Response.

When beacon update manager 720 receives the beacon, in one embodiment, beacon update manager 720 determines whether the beacon includes a request for beacons to be sent in response. If so, in one embodiment beacon update manager 720 signals urgent request manager 740, which proceeds as described herein and above, and beacon update manager 720 may additionally or alternatively set the hysteresis counter stored in device storage 624 equal to a predetermined value, (which may be any value, and may be the same as or different from the value to which other actors may set the hysteresis counter as described herein), and may also signal beacon rate increaser 672, which proceeds as described herein and above.

Beacon update manager 720 also compares the information in the beacon to the beacon information stored in received beacon storage 750. In one embodiment, the information in the beacon additionally includes the node identifier of the next hop node that built the beacon (or if the beacon was built by the management device, the identifier of the management device) and that node's cost of sending a message to the management device/destination (or a cost of zero if the beacon was built by the management device), while the information stored in beacon storage 750 includes, for each next hop node or management device/destination identifier: that node or management device's advertised cost; the identifiers of the first N nodes in the path to the management device/destination from that node (where N may be any number, e.g. four); the timestamp of the last beacon received from that node or management device; and the total cost of sending a message to the management device/destination via that node or management device, from the node in which beacon update manager 720 resides as described in more detail in the related applications. In one embodiment, the cost is the number of hops required to send the message, and therefore the total cost is equal to the advertised cost plus one. In other embodiments, the cost may be calculated using different techniques, such as those described in the related application.

Determining Whether Cost of Received Beacon is New.

If the node or management device/destination identifier included in the received beacon is stored in beacon storage 750, and associated therewith the same cost as the cost included in the received beacon, beacon update manager 720 requests and receives a timestamp from operating system 680, and stores the timestamp in beacon storage 750, associated with the node or management device/destination identifier included in the received beacon, and replacing any previously stored timestamp associated with that node or management device/destination identifier. In one embodiment, the system proceeds when another communication is received as described herein and above.

Otherwise, if the node or management device/destination identifier included in the received beacon is not stored with an associated advertised cost in beacon storage 750, or if that node or management device/destination identifier is stored associated with a different advertised cost than the advertised cost included in the received beacon, beacon update manager 720 stores the advertised cost included in the received beacon in beacon storage 750, associated with the node or management device/destination identifier included in the received beacon, and replacing any previously stored advertised cost associated with that node identifier.

In one embodiment, before beacon update manager 720 stores the advertised cost as described above, beacon update manager identifies whether the hop count in the beacon is higher (or significantly higher, e.g. by ten or twenty percent) than the one stored in beacon storage that corresponds to the same sending node, and optionally, the same destination, and/or whether the hop count in the beacon is higher or not as high as the hop count for the receiving node, optionally for the same destination. If one or the other of these conditions is true, beacon update manager 720 signals beacon rate increaser 672, and optionally deletes the beacon or the portion of the beacon corresponding to the destination or destinations having hop count corresponding to the condition from beacon storage 750. In one embodiment, the signal provided to beacon rate increaser 672 indicates that other beacons are desired, which causes beacon rate increaser 672 to cause the sequence number to be increased by one more than it would otherwise be or to set the request flag in device storage 624 requesting beacons as described above.

Beacon update manager 720 also requests and receives a timestamp from operating system 680, and stores the timestamp in beacon storage 750, associated with the node or management device/destination identifier included in the received beacon, and replacing any previously stored timestamp associated with that node or management device/destination identifier. Beacon update manager 720 also provides the advertised cost included in the received beacon to total cost manager 730, optionally along with additional information such as the node or management device/destination identifier included in the received beacon, and total cost manager 730 proceeds as described herein and below.

In one embodiment, when beacon update manager 720 has updated the beacon information in beacon storage 750, beacon update manager 720 also uses the timestamp received from operating system 680 to delete any expired beacon information from beacon storage 750, for example, beacon information that includes a timestamp ten minutes or more in the past. Other time thresholds may be used in other embodiments to determine when beacon information expires.

Determine Total Cost.

When total cost manager 730 receives the advertised cost and any additional information from beacon update manager 720, total cost manager 730 determines the total cost of sending a message to the management device/destination via the node or management device/destination corresponding to the received advertised cost. In the embodiment that cost corresponds to hop count as described herein, total cost manager 730 may for example determine the total cost by adding one to the advertised cost. Other techniques of determining total cost, such as those described in the related applications, may be used in other embodiments. When total cost manager 730 has determined the total cost, total cost manager 730 provides the total cost to beacon update manager 720.

When beacon update manager 720 receives the total cost, beacon update manager 720 stores the total cost in beacon storage 750, associated with the node or management device/destination identifier included in the received beacon, and replacing any previously stored total cost associated with that node or management device/destination identifier. In one embodiment, the system proceeds when another communication is received as described herein and above. Different communications may be received from the same device or any number of devices.

Receiving and Retransmitting Messages.

When message compare manager 760 receives a message from wireless communication receiver 622 as described herein and above, message compare manager 760 determines whether the message is new. As described herein and above, in one embodiment it is possible that a message may be received twice. In this embodiment, such messages may be stored in a cache in message/beacon storage 714, which holds the most recently received messages. Message compare manager 760 compares the messages stored in message/beacon storage 714. If the message is stored in message/beacon storage 714, in one embodiment message compare manager 760 determines that the message is not new, and discards the message. In this embodiment, the system proceeds when another communication is received as described herein and above. Otherwise, if message compare manager 760 determines that the message is new, message compare manager 760 stores the message contents in message/beacon storage 714 and provides the message to next hop identifier 770.

When next hop identifier 770 receives the message, next hop identifier 770 uses the beacon information stored in received beacon storage 750 to identify a next hop node to which the message may be forwarded as described in more detail in the related application. In one embodiment, next hop identifier 770 identifies the next hop node as the node corresponding to the lowest total cost by which a message may be sent to the management device/destination. Additionally or alternatively, next hop identifier 770 may identify the next hop node as described in the related application, and the cost that node advertised as the total cost of routing in its beacon. It is noted that next hop identifier 770 may identify the management device/destination itself as the next hop node.

In one embodiment, messages additionally include the advertised cost that the sender of the message believes the recipient to incur in sending messages to the management device. In this embodiment, next hop identifier 770 provides the advertised cost included in the message, along with the identifier of the next hop node, to cost compare manager 776.

In this embodiment, when cost compare manager 776 receives the advertised cost and the next hop node identifier, cost compare manager 776 locates the total cost stored in received beacon storage 750 associated with the identified next hop node. Cost compare manager 776 compares that total cost to the advertised cost received from next hop identifier 770, and if the costs are different (i.e., if the cost predicted by the sender of the message does not match the cost that the node expects to incur in sending the message), cost compare manager 776 signals request-to-beacon manager 674, which proceeds as described herein and above. In one embodiment, cost compare manager 776 also sets the hysteresis counter stored in device storage 624 to a predetermined value, which may be any value. When cost compare manager 776 has signaled request-to-beacon manager 674, or if the two costs are the same, cost compare manager 776 signals next hop identifier 770.

When next hop identifier 770 receives the signal, or in the embodiment that messages do not contain advertised costs, when next hop identifier 770 has identified the next hop node, next hop identifier 770 provides the message, associated with the next hop node identifier and the advertised cost of routing from that node, to message rebuilder 772.

When message rebuilder 772 receives the message and associated information, message rebuilder 772 builds a new message. Message rebuilder 772 includes in the new message: any data included in the received message; any advertised cost received from next hop identifier 770; as a destination node identifier, the next hop node identifier received from next hop identifier 770, along with an indication that the destination node identifier corresponds to the node to which the message is being sent; as a source node identifier, the identifier of the node in which message rebuilder 772 resides, which message rebuilder 772 may for example request and receive from radio 610, along with an indication that the second node identifier corresponds to the node that built the message; and, associated with the second node identifier, a sequence number. In one embodiment, the sequence number is stored in device storage 624, and message rebuilder 772 may for example increment the stored sequence number to cause receiving nodes to send beacons at a more rapid rate than they may be employing as described. When message rebuilder 772 has built the new message, message rebuilder 772 provides the new message to message sender 774.

When message sender 774 receives the new message, message sender 774 sends the new message via radio 610, for example using the channel or addressed to the destination used for messages as described herein and above. In one embodiment, when message sender 774 has sent the new message, the system proceeds when another communication is received as described herein and above.

Receiving an Original Message for Broadcast.

In one embodiment, at any time, original message receiver 780 may receive data to be forwarded to the management device or another destination, for example from one or more applications (not shown). When original message receiver 780 receives the information, in one embodiment message receiver 780 signals next hop identifier 770, and when so signaled, next hop identifier 770 identifies a next hop node as described above and provides the next hop node identifier and the cost advertised by that node to original message receiver 780. When original message receiver 780 receives the next hop node identifier, original message receiver 780 provides the received data and the next hop node identifier and cost to message builder 782.

When message builder 782 receives the data and the next hop node identifier, message builder 782 builds a new message including the data as described above. Message builder 782 also includes in the new message, the cost; as a first node identifier, the received next hop node identifier, along with an indication that the first node identifier corresponds to the node to which the message is being sent; as a second node identifier, the identifier of the node in which message builder 782 resides, which message builder 782 may for example request and receive from radio 610, along with an indication that the second node identifier corresponds to the node that built the message; and, the highest sequence number associated with the first node identifier stored in beacon storage 750. When message builder 782 has built the new message, message builder 782 provides the new message to message sender 774, and message sender 774 sends the message as described herein and above.

Multiple Destinations.

As described herein, all beacons are for the same destination, or one destination may be interchangeable with another. In such embodiment, the beacons may or may not contain an identifier of the destination. In one embodiment, the beacons do contain the identifier of the destination, and the system and method treats each destination independently of the others. The beacon sent for each destination also includes the identifier of the destination and each destination uses its own timer. The determinations of the number of parents, first parent, zero parent, etc are performed for the destination corresponding to the timer that signals. Each destination has its own beacon rate and hysteresis counter, and the beacon rate or hysteresis counter is adjusted as described herein for that destination's beacon.

The information for a beacon specifying a destination is compared only for information from other beacons having the same destination. Data to be forwarded to a destination contains the identifier of the destination to which the data is to be forwarded, and the next hop node is identified for sending the data using the information corresponding to the specified destination.

Summary.

There has been described a method of, and computer program product for, identifying a rate at which routing information is provided, including identifying one of a plurality of beacon rate increase events during a first period of time responsive to at least one of the one of the plurality of beacon rate increase events identified during the first period of time, changing from a first rate at which routing information about a device is wirelessly provided from the device that is in effect at least before the first period of time to a second rate, higher than the first rate, at which routing information about the device is wirelessly provided by the device at least after the first period of time, and responsive to none of the plurality of beacon rate increase events being received during a second period of time, following the first period of time, changing from the second rate at which routing information about the device is wirelessly provided by the device, to a third rate, lower than the second rate, at which routing information about the device is wirelessly provided by the device.

There exists an optional feature, whereby at least one of the plurality of beacon rate increase events includes receipt of a message intended to result in an increase in a rate at which routing information is wirelessly provided by the device.

There exists an optional feature, whereby at least one of the plurality of beacon rate increase events includes a quantity dropping down below a threshold.

There exists an optional feature, whereby the quantity includes a number of nodes through which messages may be routed from the device.

There exists an optional feature, whereby the nodes through which messages may be routed from the device excludes at least one node that advertises it may route messages, but such node routes messages through the device.

There exists an optional feature, whereby at least one of the plurality of beacon rate increase events includes detection of a quantity that has risen to meet or exceed a threshold.

There exists an optional feature, whereby the quantity includes a number of nodes through which messages may be routed from the device.

There exists an optional feature, whereby the threshold includes one.

There exists an optional feature, whereby at least one of the plurality of beacon rate increase events includes a quantity dropping to zero.

There has been disclosed a system for identifying a rate at which routing information is provided, including a beacon rate increase event detector having at least one input coupled for receiving at least one indicator of at least one beacon rate increase event, the beacon rate increase event detector for identifying one of a plurality of rate increase events, and responsive to at least one of the plurality of beacon rate increase events being detected, providing at an output an indication that at least one beacon rate increase event has been identified; a beacon rate increaser having an input coupled to the beacon rate increase event detector output for receiving the indication, the beacon rate increaser for, responsive to the indication indicating at least one of the plurality of rate increase events was received, during the first period of time, changing from a first rate at which routing information about a device is wirelessly provided from the device that is in effect at least before the first period of time to a second rate, higher than the first rate, at which routing information about the device is wirelessly provided by the device at least after the first period of time; and a beacon rate decreaser having an input coupled to the beacon rate increase event detector output for receiving the indication, the beacon rate decreaser for, responsive to none of the plurality of rate increase event being received during a second period of time, following the first period of time, changing from the second rate at which routing information about the device is wirelessly provided by the device, to a third rate, lower than the second rate, at which routing information about the device is wirelessly provided by the device.

There exists an optional feature, whereby the beacon rate increase event detector includes a management device manual increaser having an input coupled to the beacon rate increase event detector input for receiving a message intended to result in an increase in a rate at which routing information is wirelessly provided by the device, the management device manual increaser for providing the indication at the output coupled to the beacon rate increase event detector output responsive to the message received.

There exists an optional feature, whereby the beacon rate increase event detector includes a next hop threshold identifier having an input coupled to the beacon rate increase event detector for receiving a quantity, the next hop threshold identifier for providing the indication at an output coupled to the beacon rate increase event detector output responsive to the quantity dropping down below a threshold.

There exists an optional feature, whereby the quantity includes a number of nodes through which messages may be routed from the device.

There exists an optional feature, whereby the nodes through which messages may be routed from the device excludes at least one node that advertises it may route messages, but such node routes messages through the device.

There exists an optional feature, whereby the beacon rate increase event detector includes a number identifier, having an input coupled to the beacon rate increase event detector input for receiving a quantity, the number identifier for providing the indication at an output coupled to the beacon rate increase event detector output responsive to the quantity having risen to meet or exceed a threshold There exists an optional feature, whereby the quantity includes a number of nodes through which messages may be routed from the device.

There exists an optional feature, whereby the threshold includes one.

There exists an optional feature the beacon rate increase event detector comprises a next hop quantity identifier having an input coupled to the beacon rate increase event detector for receiving a quantity of nodes through which messages can be routed, the next hop quantity identifier for providing the indicator at an output coupled to the beacon rate increase event detector output responsive to the quantity of nodes through which messages can be routed dropping to zero.

The invention claimed is:

1. A method comprising:
    identifying one of a plurality of beacon rate increase events during a first period of time;
    responsive to identifying at least one of the plurality of beacon rate increase events during the first period of time, changing from a first rate at which routing information is provided from a device, the first rate being in effect at least before the first period of time, to a second rate, higher than the first rate, at which routing information is provided by the device at least after the first period of time; and
    responsive to none of the plurality of beacon rate increase events being received during a second period of time, the second period of time following the first period of time, changing from the second rate at which routing information is provided by the device, to a third rate, lower than the second rate, at which routing information is provided by the device,
    wherein the routing information provided by the device indicates a cost of routing a message through a network along a path from the device to the destination,
    wherein the routing information is provided by the device in one or more beacons, each of the one or more beacons including an identifier of the device, an identifier of the destination, and information identifying a next-hop along a best path from the device to the destination,
    wherein the information identifying the next-hop allows looping, in routing from the device to the destination, to be avoided,
    wherein the best path is a lowest cost path from the device to the destination, and
    wherein the cost is a metric of distance from the device to the destination.

2. The method of claim 1, wherein at least one of the plurality of beacon rate increase events comprises receipt of a message intended to result in an increase in a rate at which routing information is provided by the device.

3. The method of claim 1, wherein at least one of the plurality of beacon rate increase events comprises a quantity dropping down below a threshold.

4. The method of claim 3, wherein the quantity comprises a number of nodes through which messages may be routed from the device.

5. The method of claim 4, wherein the nodes through which messages may be routed from the device exclude at least one node that advertises it may route messages, but such node routes messages through the device.

6. The method of claim 1, wherein at least one of the plurality of beacon rate increase events comprises detection of a quantity that has risen to meet or exceed a threshold.

7. The method of claim 6, wherein the quantity comprises a number of nodes through which messages may be routed from the device.

8. The method of claim 7, wherein the threshold comprises one.

9. The method of claim 1, wherein at least one of the plurality of beacon rate increase events comprises a quantity dropping to zero.

10. A system comprising:
    a beacon rate increase event detector having at least one input coupled for receiving at least one indicator of at least one beacon rate increase event, the beacon rate increase event detector for identifying one of a plurality of rate increase events, and responsive to at least one of the plurality of beacon rate increase events being detected, providing at an output an indication that at least one beacon rate increase event has been identified;
    a beacon rate increaser having an input coupled to the beacon rate increase event detector output for receiving an indication, the beacon rate increaser for, responsive to an indication indicating at least one of the plurality of rate increase events was received during a first period of time, changing from a first rate at which routing information is provided from a sending device, the first rate being in effect at least before the first period of time, to a second rate, higher than the first rate, at which routing information is provided by the sending device at least after the first period of time; and
    a beacon rate decreaser having an input coupled to the beacon rate increase event detector output for receiving an indication, the beacon rate decreaser for, responsive to none of the plurality of rate increase events being received during a second period of time, the second period of time following the first period of time, changing from the second rate at which routing information is provided by the device, to a third rate, lower than the second rate, at which routing information is wirelesly provided by the device, wherein the routing information provided by the device indicates a cost of routing a message through a network along a path from the device to the destination, wherein the routing information is provided by the device in one or more beacons, each of the one or more beacons including an identifier of the device, an identifier of the destination, information identifying a next-hop along a best path from the device to the destination, wherein the information identifying the next-hop allows looping, in routing from the device to the destination, to be avoided, wherein the best path is a lowest cost path from the device to the destination, and wherein the cost is a metric of distance from the device to the destination.

11. The system of claim 10, wherein the beacon rate increase event detector comprises a management device manual increaser having an input coupled to the beacon rate increase event detector input for receiving a message intended to result in an increase in a rate at which routing information is provided by the device, the management device manual increaser for providing the indication at the output coupled to the beacon rate increase event detector output responsive to the message received.

12. The system of claim 10, wherein the beacon rate increase event detector comprises a next hop threshold identifier having an input coupled to the beacon rate increase event detector for receiving a quantity, the next hop threshold identifier for providing the indication at an output coupled to the beacon rate increase event detector output responsive to the quantity dropping down below a threshold.

13. The system of claim 12, wherein the quantity comprises a number of nodes through which messages may be routed from the device.

14. The system of claim 13, wherein the nodes through which messages may be routed from the device exclude at least one node that advertises it may route messages, but such node routes messages through the device.

15. The system of claim 10, wherein the beacon rate increase event detector comprises a number identifier, having an input coupled to the beacon rate increase event detector input for receiving a quantity, the number identifier for providing the indication at an output coupled to the beacon rate increase event detector output responsive to the quantity having risen to meet or exceed a threshold.

16. The system of claim 15, wherein the quantity comprises a number of nodes through which messages may be routed from the device.

17. The system of claim 16, wherein the threshold comprises one.

18. The system of claim 10, wherein the beacon rate increase event detector comprises a next hop quantity identifier having an input coupled to the beacon rate increase event detector for receiving a quantity of nodes through which messages can be routed, the next hop quantity identifier for providing the indicator at an output coupled to the beacon rate increase event detector output responsive to the quantity of nodes through which messages can be routed dropping to zero.

19. A non-transitory computer-readable medium having computer-readable program code embodied therein, the computer-readable program code being executable to cause a computer system to:

identify one of a plurality of beacon rate increase events during a first period of time;

responsive to identifying at least one of the one of the plurality of beacon rate increase events during the first period of time, change from a first rate at which routing information is provided from the device, the first rate being in effect at least before the first period of time, to a second rate, higher than the first rate, at which routing information is wirelesly provided by the device at least after the first period of time; and responsive to none of the plurality of beacon rate increase events being received during a second period of time, the second period of time following the first period of time, change from the second rate at which routing information is provided by the device, to a third rate, lower than the second rate, at which routing information is provided by the device, wherein the routing information provided by the device indicates a cost of routing a message through a network along a path from the device to the destination, wherein the routing information is provided by the device in one or more beacons, each of the one or more beacons including an identifier of the device, an identifier of the destination, and information identifying a next-hop along a best path from the device to the destination, wherein the information identifying the next-hop allows looping, in routing from the device to the destination, to be avoided, wherein the best path is a lowest cost path from the device to the destination, and wherein the cost is a metric of distance from the device to the destination.

20. The computer-readable medium of claim 19, wherein at least one of the plurality of beacon rate increase events comprises receipt of a message intended to result in an increase in a rate at which routing information is provided by the device.

21. The computer-readable medium of claim 19, wherein at least one of the plurality of beacon rate increase events comprises a quantity of nodes through which messages may be routed from the device, but excluding at least one node that advertises it may route messages, but such node routes messages through the device dropping down below a threshold.

22. The computer-readable medium of claim 19, wherein at least one of the plurality of beacon rate increase events comprises detection of a quantity that has risen to meet or exceed a threshold.

23. The computer-readable medium of claim 22, wherein the quantity comprises a number of nodes through which messages may be routed from the device.

24. The computer-readable medium of claim 23, wherein the threshold comprises one.

25. The computer-readable medium of claim 19, wherein at least one of the plurality of beacon rate increase events comprises a quantity dropping to zero.

* * * * *

UNITED STATES PATENT AND TRADEMARK OFFICE
CERTIFICATE OF CORRECTION

PATENT NO. : 9,077,638 B2  Page 1 of 1
APPLICATION NO. : 14/100145
DATED : July 7, 2015
INVENTOR(S) : Hui et al.

It is certified that error appears in the above-identified patent and that said Letters Patent is hereby corrected as shown below:

In the claims,
In column 25, line 2, please amend as follows:
second rate, at which routing information is wirelessly

In column 26, line 13, please amend as follows:
information is wirelessly provided by the device at least

Signed and Sealed this
Tenth Day of November, 2015

Michelle K. Lee
*Director of the United States Patent and Trademark Office*